No. 620,257. Patented Feb. 28, 1899.
S. H. SHORT.
MEANS FOR SUSPENDING MOTORS.
(Application filed June 22, 1898.)
(No Model.)
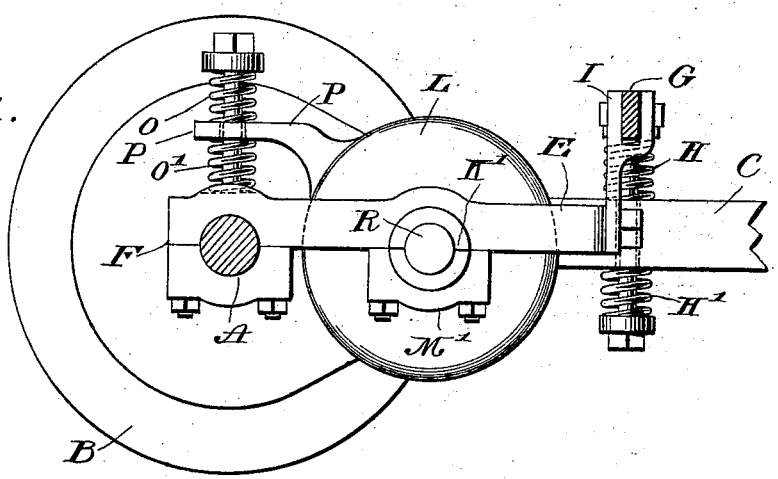
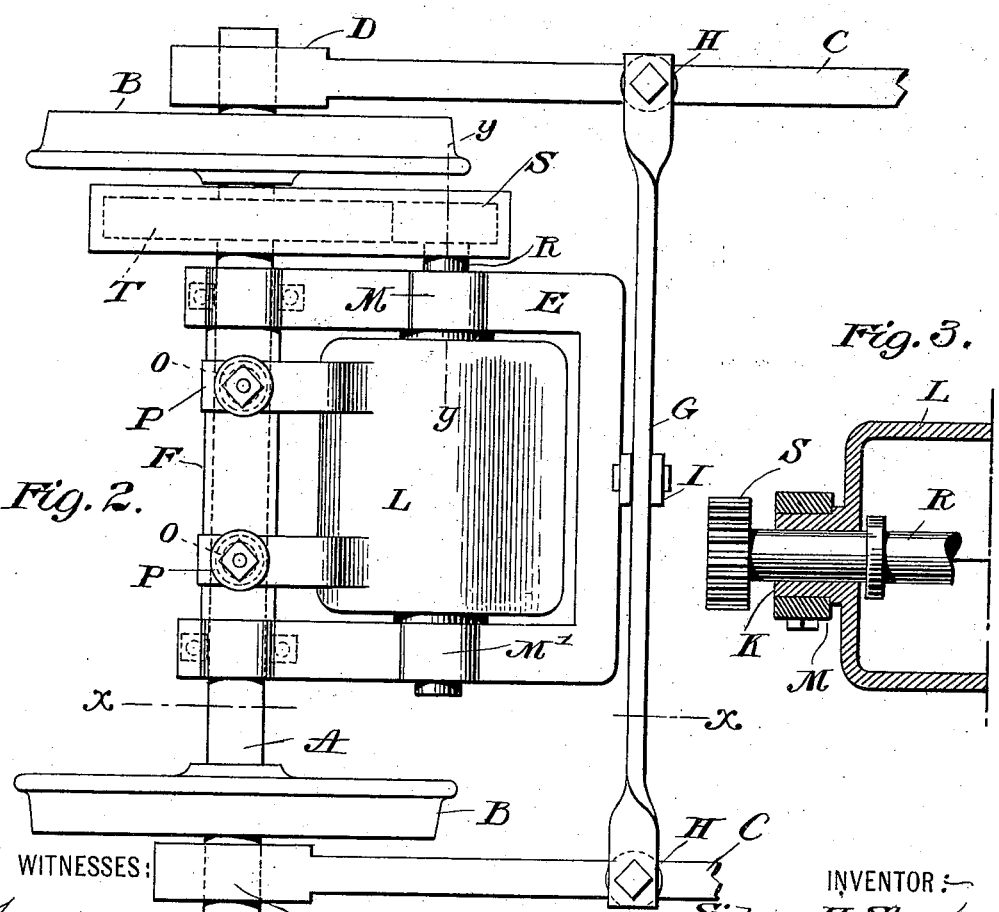
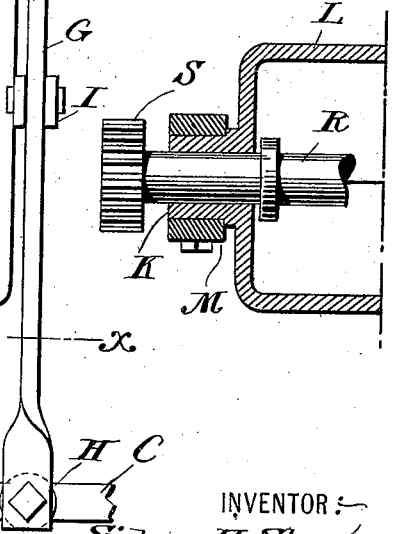
WITNESSES:
INVENTOR:
Sidney H. Short.
BY
H. B. Brownell,
ATTORNEY

UNITED STATES PATENT OFFICE.

SIDNEY H. SHORT, OF CLEVELAND, OHIO.

MEANS FOR SUSPENDING MOTORS.

SPECIFICATION forming part of Letters Patent No. 620,257, dated February 28, 1899.

Application filed June 22, 1898. Serial No. 684,137. (No model.)

*To all whom it may concern:*

Be it known that I, SIDNEY H. SHORT, a citizen of the United States, residing at Cleveland, Cuyahoga county, Ohio, have invented certain new and useful Improvements in Means for Suspending Motors, of which the following is a full, clear, and exact description.

My invention relates to improvements in means for suspending electric motors on electrically-propelled vehicles, and has for its object to provide an arrangement in which the motor is entirely supported by a frame which is in part itself spring-supported and is entirely separate and distinct from the frame or casing of the motor itself and at the same time permits the motor to have a spring-controlled movement of rotation relatively to said frame, thereby doing away with any injurious compact of the gears and producing an apparatus possessing other advantageous mechanical features.

An apparatus embodying my invention is shown in the accompanying drawings, in which—

Figure 1 is a sectional elevation on the line X X of Fig. 2. Fig. 2 is a plan view illustrating my invention. Fig. 3 is a sectional view of a portion of the motor casing and frame, showing details of construction on the line Y Y.

Referring to the drawings, A is the driven axle of the vehicle, on which the wheels B B are secured in the usual manner.

C C are the side bars of the frame of the vehicle, supported by the axles D D in the usual manner.

E is a frame, preferably four-sided, sleeved upon the axle at F and supported from the frame of the vehicle by the bar G, between which and the frame of the vehicle are springs H. Buffer-springs H' are also provided to reduce the shock due to any upward movement. The frame E is connected with the bar G by the link I. The motor itself is provided with trunnions K K', which in the form shown are integral with the casing L, which constitutes the foundation-frame of the motor. The trunnions K K' are journaled in bearings M M' in the frame E, so that the motor has a limited capacity for movement of rotation relatively to the frame E. This capacity is limited and spring-controlled by springs O O', which engage the upper and lower sides of lugs P P, extending from the motor-casing L and preferably integral therewith. The armature-shaft R carries a small gear S, which meshes with the large gear T on the driven axle, thus transmitting the motion of the armature to the driven axle. The frame E maintains the motor at a fixed distance from the driven axle and bodily supports the same.

With the cylindrical form of motor shown the entire weight of the motor comes dead upon the frame, the springs O O' serving simply to spring-control any movement of rotation relatively to the frame.

What I claim is—

1. In an electrically-propelled vehicle the combination of a driven axle, a supporting-frame at one end journaled thereon, and at the other spring-supported from an independent support, a motor having trunnions journaled in said frame and springs limiting the movement of said motor relatively to said supporting-frame, substantially as described.

2. In an electrically-propelled vehicle the combination of a driven axle, a supporting-frame at one end journaled thereon and at the other spring-supported from the frame of the vehicle, and a motor having trunnions journaled in said supporting-frame and springs limiting the movement of the motor relatively to said supporting-frame, substantially as described.

3. In an electrically-propelled vehicle the combination of a driven axle, a supporting-frame at one end journaled on said axle and having its end remote from the axle supported from the frame of the vehicle, a spring interposed between said remote end and the vehicle-frame, a motor having trunnions journaled in said supporting-frame and having rearward projections, and springs interposed between said rearward projections and said supporting-frame, substantially as described.

Signed at New York city this 20th day of June, 1898.

SIDNEY H. SHORT.

Witnesses:
L. VREELAND,
JAMES S. OSWALD.